Patented Dec. 20, 1932

1,891,887

UNITED STATES PATENT OFFICE

FOREST H. CLICKNER, OF NEW BRUNSWICK, NEW JERSEY, ASSIGNOR TO ENDOWMENT FOUNDATION, OF NEW BRUNSWICK, NEW JERSEY, A CORPORATION OF NEW JERSEY

PROCESS FOR PREPARING EGG POWDER

No Drawing. Application filed February 11, 1932. Serial No. 592,449.

This invention relates to a process for making an improved egg powder, and this application is a continuation in greater part of my application Serial No. 431,649, filed February 26, 1930.

In order that my improved process and the advantages thereof may be clearly understood and differentiated from prior processes or methods heretofore used, I desire to briefly refer to such older methods.

Heretofore, a large percentage of the egg powder of commerce has come from China, and according to the methods used in that country, the shells are first removed from the eggs and the contents, after a rough mixing together, are subjected to an ordinary drying process, in some cases utilizing the direct heat of the sun.

In another process suggested in this country, the egg material, after removing from the shells, is all ground up together, including the germs, membranes, strings, and chalazæ, and then the product is dried and baked or else frozen.

In other processes proposed, certain preservatives have been added to the egg mixture and the whole either dried or frozen for future use.

In still another process, the whites and the yolks of the eggs are beaten separately and then mixed, or are all beaten together and a small amount of water, about 1½%, added so as to enable the mixture to be spread over non-metallic drying plates, this drying process being conducted in a dark room.

A still further process is that set forth in Hatmaker Australian Patent 4,289, of October 4, 1905, wherein some water may or may not be added in order to spread the mixture over the drying rolls which are kept at a temperature of over 212 degrees Fahrenheit, the boiling point of water. In such a process, in which two rolls or cylinders are placed substantially in contact and run in reverse directions toward each other, the mixture is fed to the rolls and a puddle is nearly always present at the junction of the rolls. This puddle is kept at above boiling temperature and likewise the material as it is drawn out of the puddle by the rolls, and due to the high temperature, the albumen of the egg mixture is rendered more or less insoluble and a very inferior egg powder is produced.

It is the object of my present process to produce, with economy and certainty, an egg powder of higher quality and a far greater range of usefulness than egg powders heretofore produced by the old processes and particularly those specifically above referred to.

It is an ancillary object of my invention to produce an egg powder which has a higher keeping quality and a greater solubility than any other egg powder heretofore produced.

It is another object of my invention to produce an egg powder which will retain nearly all the characteristics of fresh eggs when the proper amount of water is added thereto and the mixture beaten.

All of the foregoing advantages, together with others which will be apparent to one skilled in this art, may be attained to the highest degree by following the one method which was described in my application herein referred to.

In this particular method, the eggs are first candled in order to remove those which are inedible or otherwise unfit as raw material for egg powder. The good eggs are then removed from the shells and to this mass of egg-meat there is then added at least 100% of water, and in certain cases up to 150% of water, which will bring down the solid content to about 10%. The entire mass is then thoroughly mixed as by a "lightning" mixer or a suitable homogenizing apparatus whereby there is developed a smooth and uniform emulsion, after which the material is strained preferably through cheese-cloth or its equivalent. This straining of the material may be carried out with comparatively great rapidity because of the great fluidity of the emulsion, and thoroughly eliminates all the substances such as the chalazæ and the membranes which are insoluble or cannot be emulsified.

The strained emulsion is then desiccated or dried by spraying with any suitable spraying apparatus into a chamber into which heated atmosphere is projected. By this process the egg particles are not subjected to a temperature in excess of 150 degrees Fahrenheit for reasons which will be directly pointed out. Due to the fineness of the particles in the emulsion, the film coating is not sheared off as the emulsion passes through the spraying nozzle into the chamber.

While the above-mentioned quantity of water produces what I term a substantially perfect product, I have found after many experiments, that the amount of water may be reduced in accordance with the keeping properties necessitated by the demands of commerce.

I have found that the keeping qualities of the egg powder are dependent upon the fineness of the subdivision of the fatty material of the egg and the amount of egg fat exposed to oxidation by the air. By the addition of a considerable quantity of water; i. e., greatly in excess of anything that has heretofore been proposed for use in the production of egg powder, I have discovered that the water dilutes the albumen and other proteins of the egg, and furthermore, that this large amount of water aids in breaking up the yolk or fatty parts of the egg into an extremely fine state, and in this condition of the fatty materials, the diluted albumenous fluid is absorbed; or in other words, the diluted proteins form a seal or film about the fine globules of the fatty material and these particles, when sprayed into a heated chamber, are protected by the protein film from direct contact with the heated atmosphere which almost instantaneously dries the moisture from the protein film, so that by the time the egg particles fall to the bottom of the chamber, they are thoroughly dried.

In this spray-drying process, the rapid evaporation of the moisture from the particles tends to cool the entire particle so that the temperature of the powder itself is never in excess of approximately 150 degrees Fahrenheit. Furthermore, the added moisture decreases the hydrogen ion concentration and the salt concentration, thus preventing coagulation of the albumen to a marked degree. Hence, the resulting dried egg powder retains its original constituents in a more soluble state.

Where the egg powder is to be marketed and used within a few weeks, I have found that the amount of water may be carried as low as 20% and still produce an egg powder which is far superior to that produced by prior art processes to which reference has been made. If the added water is much less than 20%, the fine subdivision of the fatty materials of the egg is lost and air will be beaten into the mixture which, it is obvious, will tend to cause denaturation of the protein and oxidation of the fat.

It should be explained at this point that the 20% of water referred to is an approximation based on experiments with fresh eggs or eggs having a stiff body; that is, a body in which the whites retain their natural outline when broken from the shell, are not watery, and do not run. If eggs are used which have been in an incubator at a temperature of approximately 100° F., or subjected for a time to such a temperature, hydrolysis of the albumen of the egg takes place, thus thinning it or lowering its viscosity to such a point that it becomes possible to make a fairly satisfactory egg powder, if the powder is to be used within a short period of time, by the use of water as low as about 15%. However, I do not recommend that the percentage of water be carried below 15% even with eggs having "watery" whites, for as has been explained, the higher the percentage of water used in preparing the mixture, the better the resultant product.

Where the egg powder is to be kept for a longer period of time than above indicated, then the powder should be prepared with a greater percentage of water, the percentage of water increasing according to the increase in time that the egg powder is to be kept. The egg powder produced by the use of 100% to 150% of added water, will keep for a very long period of time and is the powder to which I have referred as being practically perfect.

From what has been said, it will be obvious that my process differs materially from prior art processes and therefore the claims should not be unduly restricted in their meaning.

Having thus described my invention, what I claim is:

1. The process of producing egg powder which consists in removing the shells from the eggs, adding a considerable quantity of water not less than 15%, vigorously agitating the mixture to form an emulsion, removing the insoluble or unemulsifiable materials and then desiccating the emulsion by spraying into a heated atmosphere.

2. The process of producing egg powder which consists in removing the shells from the eggs, then adding a considerable quantity of water in amount not less than 15% of the mass to dilute the albumen or whites of the eggs for the purposes described, and to insure that the fatty materials will be finely subdivided by a succeeding step in the process, vigorously agitating the mixture to form an emulsion, removing the insoluble or unemulsifiable materials, and then desiccating the emulsion by spraying into a heated atmosphere.

3. The process of producing an improved egg powder consisting in mixing with the egg-mass as removed from the shells, a quantity of water in excess of 15% of the mass, emulsifying the mass, removing the unemulsifiable material and desiccating the remaining mixture to produce a powder.

4. The method of producing an improved egg powder as set forth in claim 1, further characterized in that the egg particles during the spraying process do not reach a temperature in excess of 150 degrees Fahrenheit.

5. The process of producing an egg powder having predetermined keeping properties which consists in mixing with the egg mass as removed from the shells, a considerable quantity of water not less than 15% of the mass, and increasing the quantity of water to at least 100% as it is desired to obtain an egg powder which will keep longer than that produced by the use of the smaller quantity of water, emulsifying the mass, removing the unemulsifiable material and then desiccating the mixture by spraying into a heated atmosphere.

6. The improvement in the art of making egg powder which consists in adding to the egg meats a considerable quantity of water in an amount not less than 15% of the mass to greatly increase the fluidity of the mass, vigorously agitating the mixture to form an emulsion, straining out the insoluble or unemulsifiable materials, and then quickly drying the strained liquid in a manner so that the residue left from straining is not subjected to a temperature in excess of 150° F.

7. The improvement in the art of preparing powder from eggs which consists in removing the shells, adding to the resulting mass at least 100% of water, emulsifying the mass by a whipping process, straining out the unemulsifiable material, and then desiccating the strained liquid by spraying into a heated atmosphere.

8. The improvement in the art of preparing powder from eggs which comprises in adding to egg material from which the shell has been removed, a quantity of water at least equal to that of the egg material, mixing and emulsifying the mass, removing the unemulsifiable material, and desiccating the resulting liquid to produce a powder.

9. The improvement in the art of preparing powder from eggs which comprises in adding to egg material from which the shell has been removed, a quantity of water at least equal to that of the egg material, mixing and emulsifying the mass by a whipping process, removing the unemulsifiable material and desiccating the resulting liquid to produce a powder.

In testimony wherein, I affix my signature.

FOREST H. CLICKNER.